J. F. BEATTY.
BRAKE SHOE.
APPLICATION FILED DEC. 26, 1908.
943,730.
Patented Dec. 21, 1909.
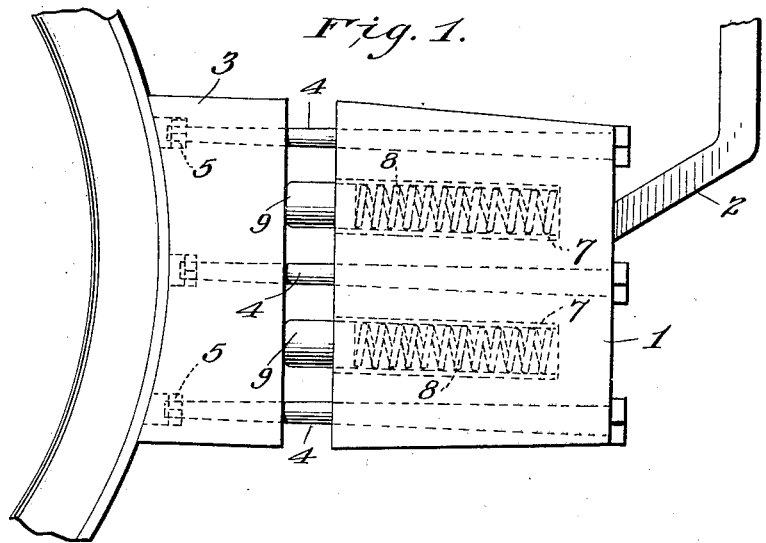
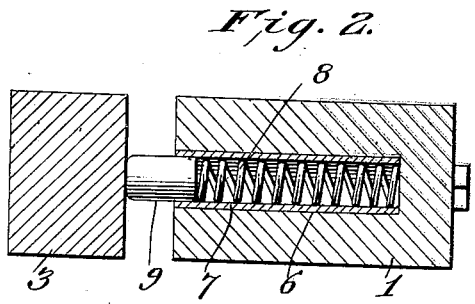
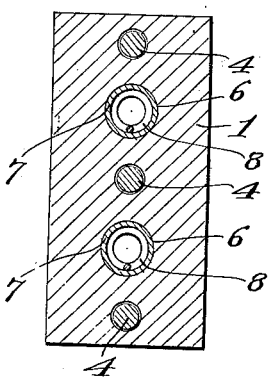
Witnesses
M. C. Lyddane
J. D. L. Mulhall
Inventor
John F. Beatty
By Joshua R. H. Potts
Attorney

UNITED STATES PATENT OFFICE.

JOHN F. BEATTY, OF MORTON, PENNSYLVANIA.

BRAKE-SHOE.

943,730.  Specification of Letters Patent.  Patented Dec. 21, 1909.

Application filed December 26, 1908. Serial No. 469,407.

*To all whom it may concern:*

Be it known that I, JOHN F. BEATTY, a citizen of the United States, residing at Morton, in the county of Delaware and State of Pennsylvania, have invented certain new and useful Improvements in Brake-Shoes, of which the following is a specification.

My invention relates to an improved brake shoe particularly designed for use on heavy vehicles, an object of the invention being to provide a brake shoe with a yielding wearing plate or block, which will permit a certain amount of elastic or yielding movement against the wheel rim, to prevent any possibility of locking the shoe against the wheel, and hence overcome the danger of skidding, due to this locking of the brakes, such as ordinarily used.

With these and other objects in view, the invention consists in certain novel features of construction, and combinations, and arrangements of parts as will be more fully hereinafter described, and pointed out in the claims.

In the accompanying drawings, Figure 1, is a view in elevation illustrating my improvements. Fig. 2, is a view in longitudinal section, and Fig. 3, is a view in cross section.

My improved brake shoe comprises a body block 1, adapted to be secured to an operating lever 2, or other means for moving the shoe toward and away from the wheel.

3 represents a wearing plate or block, which is connected to the body block 1 by means of conical bolts 4. These bolts extend entirely through the blocks 1 and 3, and are threaded at one end for the reception of nuts 5 to lock the parts together, and yet permit movement of the block 3 toward and away from the block 1. The bolts 4 are disposed parallel to each other, one being located at the center and the other two near the edges of the blocks, and the block 1, at points between the center bolt 4, and the outside bolts, is made with recesses or pockets 6, in which metal tubes 7 are secured, and coiled springs 8 are housed within said tubes.

Plungers 9 preferably of rubber or other elastic material, are located in the ends of tubes 7, and are pressed outward by the springs 8 to elastically project the block 3. This block 3 is preferably made of malleable metal and when the brakes are applied, will exert strong frictional engagement against the wheel rim. When the pressure is very great, there is always a tendency of the brake shoes locking against the rim. This I entirely overcome, as the spring pressed plungers 9 will allow the block or plate 3 to move backward toward the block 1 sufficient to prevent any possibility of locking. This construction also allows the brakes to be gradually applied and not thrown on suddenly as is usually the case. When the block 3 first engages the wheel rim, it is only held in contact by reason of the springs 8 under the smallest pressure of said springs, and as more pressure is applied on the operating means, the body 1 is moved toward the block or plate 3, and the springs are pressed exerting a corresponding increase of pressure on the block or plate 3.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. A brake shoe comprising a body block having recesses therein, a wearing block, bolts secured in alined openings in said blocks, plungers secured to the wearing block and projecting into the recesses in the body block, and springs in said recesses bearing against said plungers.

2. A brake shoe comprising a body block, a wearing block, bolts secured in alined openings in said blocks, tubes secured in recesses in the body block, springs in said tubes, and plungers in said tubes between the ends of the spring and the wearing block.

3. A brake shoe comprising a body block, a wearing block, bolts located in alined openings in the blocks, devices at the ends of the bolts limiting the separation of the wearing block from the body block, and the movement of the bolts, said body block having recesses in its edge adjacent the wearing block, plungers on the wearing block movable in said recesses, and coiled springs in said recesses bearing against the plungers.

In testimony whereof I have signed my name to this specification in the presence of two subscribing witnesses.

JOHN F. BEATTY.

Witnesses:
R. H. KRENKEL,
J. A. L. MULHALL.